(12) United States Patent
Johnson

(10) Patent No.: US 10,730,432 B1
(45) Date of Patent: Aug. 4, 2020

(54) TRAFFIC EMERGENCY SIGNALLING DEVICE

(71) Applicant: Joseph D. Johnson, Annapolis, MD (US)

(72) Inventor: Joseph D. Johnson, Annapolis, MD (US)

( * ) Notice: Subject to any disclaimer, the term of this patent is extended or adjusted under 35 U.S.C. 154(b) by 0 days.

(21) Appl. No.: 16/743,015

(22) Filed: Jan. 15, 2020

(51) Int. Cl.
*B60Q 7/00* (2006.01)
*G08G 1/0955* (2006.01)
*G09F 27/00* (2006.01)

(52) U.S. Cl.
CPC ............. *B60Q 7/00* (2013.01); *G08G 1/0955* (2013.01); *G09F 27/004* (2013.01)

(58) Field of Classification Search
CPC ........ B60Q 7/00; G08G 1/0955; G09F 27/004
USPC ... 340/908, 908.1, 691.1, 691.6, 693.5, 321, 340/332
See application file for complete search history.

(56) References Cited

U.S. PATENT DOCUMENTS

| | | |
|---|---|---|
| 3,589,328 A | 6/1971 | Kiniry et al. |
| 3,600,059 A | 8/1971 | Evans |
| 3,759,214 A | 9/1973 | Evans et al. |
| 3,806,234 A | 4/1974 | Brudy |
| 4,403,565 A | 9/1983 | Bleiweiss et al. |
| 4,440,104 A | 4/1984 | Bleiweiss et al. |
| 4,875,028 A | 10/1989 | Chou |
| 5,512,876 A | 4/1996 | Brusca |
| 6,275,149 B1 | 8/2001 | Tung |
| 6,276,080 B1 | 8/2001 | Brennan |
| 7,158,020 B2 | 1/2007 | Grady, Jr. |
| 7,656,284 B2 | 2/2010 | Dolcetta et al. |
| 2002/0017561 A1* | 2/2002 | Tomoike ................. G06Q 20/04 235/383 |
| 2014/0119041 A1* | 5/2014 | Petrucelli ............. F21V 33/0084 362/523 |
| 2015/0293294 A1* | 10/2015 | Chang .................. G02B 6/0028 362/610 |
| 2018/0154828 A1* | 6/2018 | Wornham ............... G09F 13/16 |

\* cited by examiner

*Primary Examiner* — Daryl C Pope
(74) *Attorney, Agent, or Firm* — Cramer Patent & Design, PLLC; Aaron R. Cramer

(57) ABSTRACT

A traffic emergency signaling device is fashioned as a triangular overall structure having a plurality of lights disposed upon a back plane and covered with a protective outer housing hingedly attached to the back plane. A handle is provided at the top to aid in carrying the device and to secure the outer housing to the back plane. A pair of swivel stands are secured beneath the bottom of the device. A power supply is integral with the device.

19 Claims, 6 Drawing Sheets

TRAFFIC EMERGENCY SIGNALLING DEVICE

RELATED APPLICATIONS

Not applicable.

FIELD OF THE INVENTION

The present invention relates generally to a traffic emergency signaling device.

BACKGROUND OF THE INVENTION

Street and highway safety is at the forefront of concerns when speaking in regard to public safety. With the ever-increasing volume of cars on the road, deaths and injuries resulting from traffic accidents continue to be an all too common occurrence. Many of these accidents are a result of vehicle breakdown or minor accidents that lead to major accidents as a result of not being seen. To help with increasing awareness and visibility, law enforcement officers, truck drivers, and even regular motorists often keep road flares in their vehicle to provide warning for oncoming vehicles.

While such flares do work, they are incendiary devices which may pose a safety risk. Additionally, such flares often have only a limited burn time which may not be long enough to clear the vehicles. Finally, when no longer needed, flares are difficult to extinguish and are often just thrown off of the side of the road which may result in additional problems such as grass fires. Accordingly, there exists a need for a means by which road safety and increased visibility for accidents, people, and vehicles can be provided without the disadvantages as listed above. The development of the traffic emergency signaling device fulfills this need.

SUMMARY OF THE INVENTION

The inventor has recognized the aforementioned, inherent problems and lack in the art and observed that there is a need for an illuminated warning triangle comprising firstly a back plane shaped as a triangular prism with a triangular center cut-out—the back plane having a circumferential lip about an entire perimeter of the back plane; secondly, an outer triangle housing having a triangular prism shape with a triangular center cut-out—the outer triangle housing is hingedly attached to the circumferential lip of the back plane. The back plane and the outer triangle housing each having a bottom leg, a first side leg, and a center side leg. The outer triangle housing hinges downward and forward from the lip of the back plane via a continuous hinge and is held captive at the top of the illuminated warning triangle via a rotating T-shaped carrying handle. The rotating T-shaped carrying handle also rotates along a rotational path that engages and disengages a first clasp from within a tab located on the outer triangle housing in a closed state. Thirdly, a pair of feet each mounted on each of the legs that support the illuminated warning triangle. Fourthly, an inner reflective lens which is incorporated into the outer triangle housing.

Fifthly, a center reflector residing within the common aligned triangular center cut-out of the back plane and the outer triangle housing when the outer triangle housing is secured to the back plane. Sixthly, a power cable which is connected to a cigarette lighter plug to electrically power the illuminated warning triangle. Seventhly, a control switch housing disposed on the power cable to provide three operating configurations of the illuminated warning triangle. Eighthly, a first rubber grommet which prevents abrasion of the power cable and water infiltration to a plurality of interior components of the illuminated warning triangle where the power cable exits the back plane. Ninthly, a first rubber gasket which is provided between the lip of the back plane and the outer triangle housing to prevent water infiltration. The first rubber gasket is slightly compressed when the first clasp is engaged by the rotating T-shaped carrying handle.

Tenthly, an internal battery bank which is secured on an interior of the battery box. The battery box is provided with a sloped lid to prevent entrance of water inside the battery box that enables the sloped lid to hinge open and travel through the triangular center cut-out of the back pane and the outer triangle housing when the center reflector is removed. Eleventhly, a second rubber gasket which is provided between the battery box and the sloped lid and is compressed by a second clasp. The second rubber grommet provides a path for internal wiring between the battery box and the electrical components housed within the outer triangle housing; and lastly, a plurality of lamps mounted to an individual socket and arrayed in a linear fashion within the outer triangle housing and interconnected in a parallel fashion with interconnecting wiring. The lamps produce light rays that exit through a translucent nature of the inner reflective lens. The array of lamps is aligned with the inner reflective lens.

The feet via the legs may be designed to rotate along a rotational path relative to the back plane such that they fold flat in alignment with the illuminated warning triangle. The pair of feet may fold flat in alignment with the illuminated warning triangle for storage. The pair of feet may also fold flat in alignment with the illuminated warning triangle and rotate ninety degrees to support the illuminated warning triangle when used. The pair of feet may be linear. The illuminated warning triangle may be illuminated from its interior such that a plurality of light rays emanates from all three sides through the inner reflective lens. The inner reflective lens may be supported within the outer triangle housing by adhesive about its perimeter sidewalls.

The inner reflective lens may have a width coextensive with a width of the outer triangle housing. The center reflector may be red and may be supported by six supports that connect to the back plane. The cigarette lighter plug may include a fuse for overcurrent protection. The power cable may be twenty feet long. The three operating configurations may be on, off, and flash. The lamps are selected from the group consisting of a plurality of incandescent lamps, a plurality of light-emitting diode lamps, or a plurality of COB lamps.

The array of lamps may be aligned with the inner reflective lens so that the lamps would produce white light that passes through the inner reflective lens which would be red in color to thus produce red light on an exterior of the illuminated warning triangle. A watertight cavity may be provided by the first rubber gasket which is compressed between the outer triangle housing and the back plane. The illuminated warning triangle may be used to signal a disabled vehicle on the side of road or may be placed before the disabled vehicle according to a direction of approaching traffic. The illuminated warning triangle may be seventeen inches long on one side position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
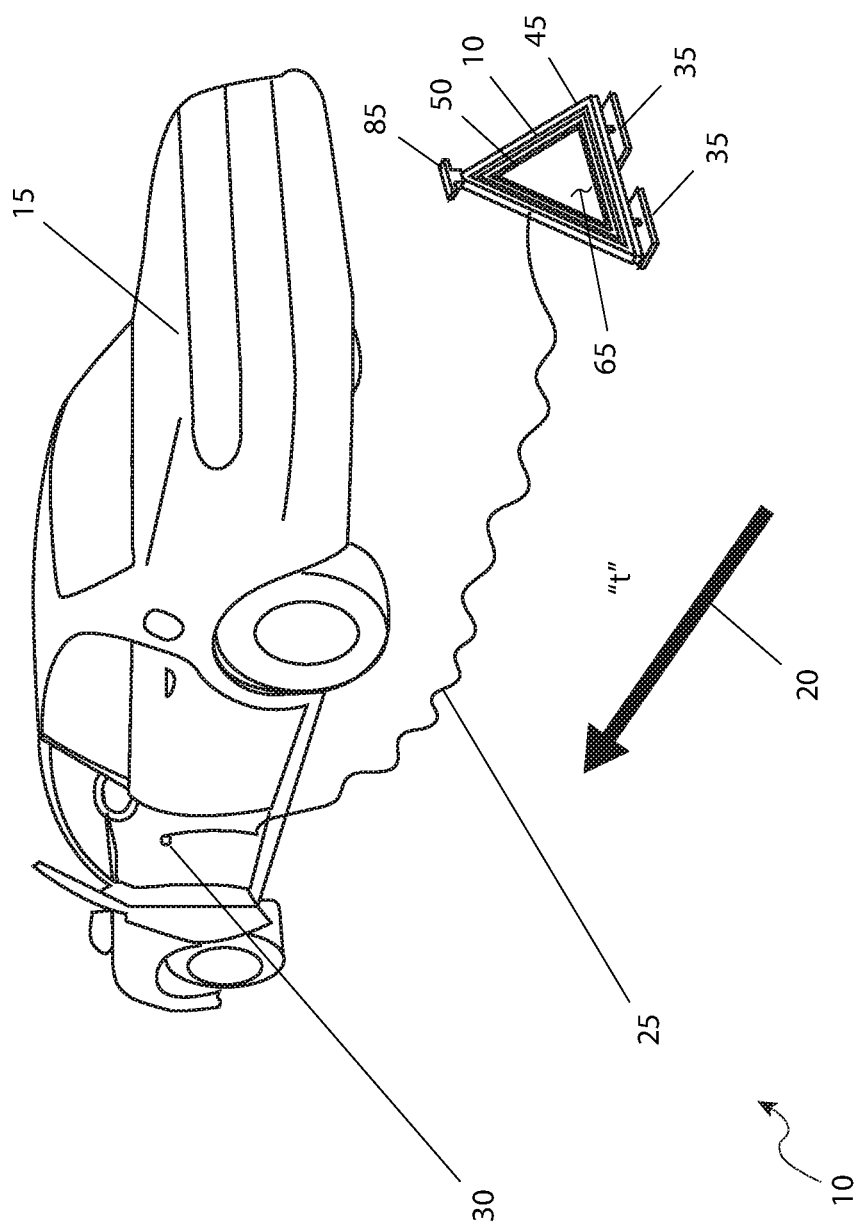
FIG. 1 is a perspective view of the illuminated warning triangle for disabled vehicles 10, shown in a utilized state, according to the preferred embodiment of the present invention.

10 illuminated warning triangle for disabled vehicles
15 disabled vehicle
20 direction of approaching traffic "t"
25 power cable
30 cigarette lighter
35 feet
36 leg
40 rotational path "a"
45 outer triangle housing
46 lip
50 inner reflective lens
55 light rays
60 back plane
65 center reflector
70 supports
75 continuous hinge
80 rotating "T"-shaped carrying handle
85 rotational path "b"
90 first clasp
91 tab
95 cigarette lighter plug
100 control switch housing
105 first rubber grommet
110 grade
115 first rubber gasket
120 internal battery bank
125 battery box
130 Styrofoam™
135 sloped lid
140 hinge
145 second rubber gasket
150 second clasp
155 second rubber grommet
160 lamps
164 socket
165 interconnecting wiring
170 fuse
175 battery charger
180 positive lead
185 three-position switch
190 flasher module

DESCRIPTION OF THE PREFERRED EMBODIMENTS

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the illuminated warning triangle for disabled vehicles 10, shown in a utilized state, according to the preferred embodiment of the present invention is disclosed. The illuminated warning triangle for disabled vehicles 10 (herein also described as the "device") 10, is used to signal a disabled vehicle on the side of road. A warning device is required by Code of Federal Regulations § 392.22 for some vehicles in some situations. The device 10 is placed before a disabled vehicle 15 according to the direction of approaching traffic "t" 20. It may be electrically powered by a power cable 25 connected to a cigarette lighter 30. Further discussion on the electrical configuration will be provided in greater detail herein below. While the overall dimensions of the device 10 are not intended to be a limiting factor of the present invention, a typical dimension of one (1) side of the device 10 is envisioned to be seventeen inches (17 in.).

Figure 2:
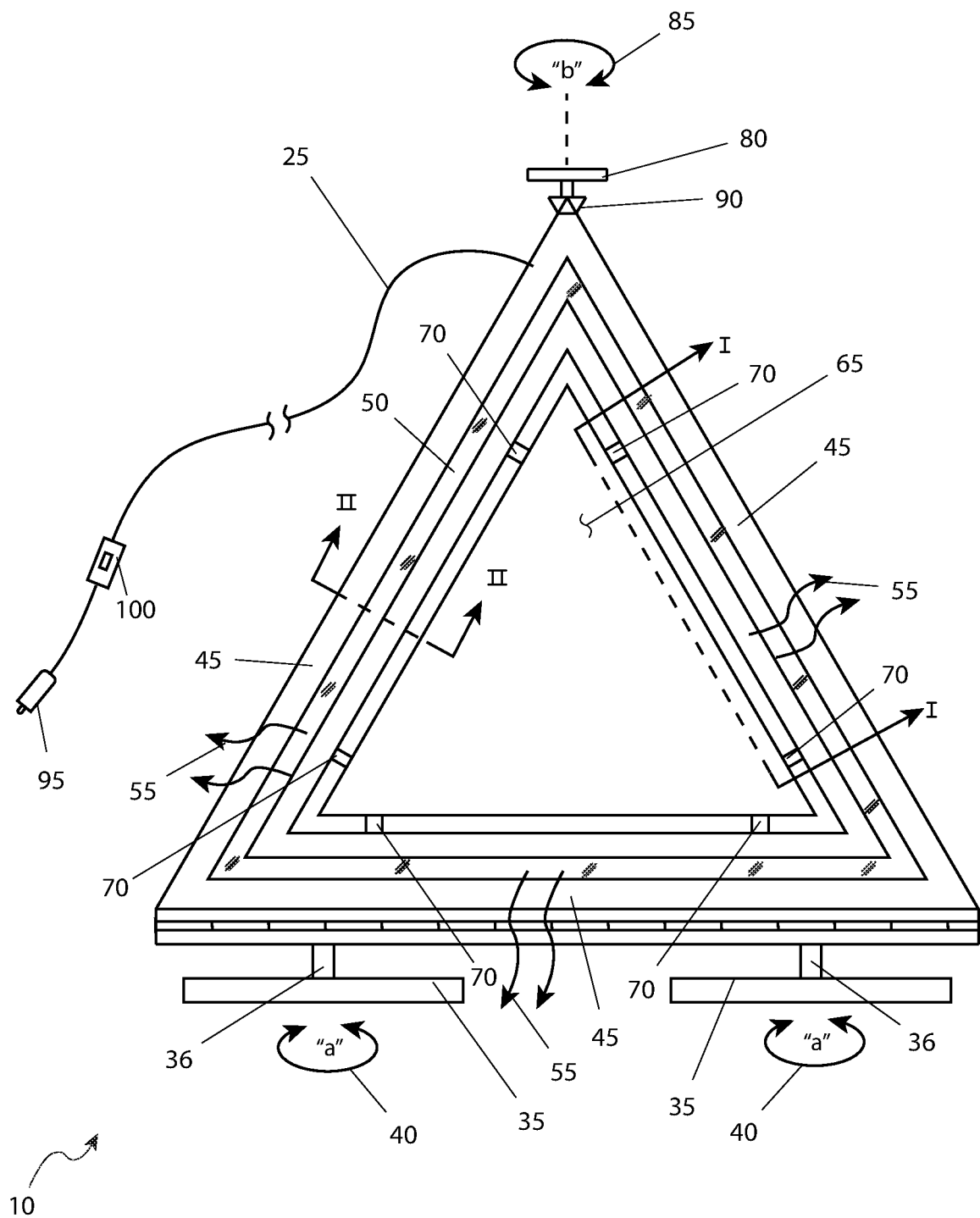
FIG. 2 is a front view of the illuminated warning triangle for disabled vehicles 10, according to the preferred embodiment of the present invention.

Referring next to FIG. 2, a front view of the device 10, according to the preferred embodiment of the present invention is depicted. The device 10 includes a backplane 60, shaped as a triangular prism with a triangular center cut-out and having a circumferential lip 46 about an entire perimeter thereof. An outer triangle housing, also a triangular prism shape with a triangular center cut-out, is hingedly attached to the lip 46 of the backplane 60. Therefore, the backplane 60 and outer triangle housing 45 each has a bottom leg, a first side leg, and a center side leg. The device 10 is supported by two (2) feet 35, each mounted on a leg 36, that are linear in design. The feet 35, via the legs 36, are designed to rotate along a rotational path "a" 40 relative to the backplane 60 such that they fold flat in alignment with the device 10 (as shown) for storage or may rotate ninety degrees (90°) such that they support the device 10 when used.

The outer triangle housing 45 also incorporates an inner reflective lens 50, preferably comprising a light diffuser panel. The device 10 is illuminated from its interior such that light rays 55 emanate from all three (3) sides, through the inner reflective lens 50. Further description on said illumination properties will be provided herein below. The inner reflective lens 50 is supported within the outer triangle housing 45 by adhesive or other means about its perimeter sidewalls. In a preferred embodiment, the inner reflective lens has a width coextensive with the width of the outer triangle housing 45. The device 10 may be provided with a center reflector 65, which is envisioned to be red in color, and which resides within the common aligned triangular center cut-out of the backplane 60 and outer triangle housing 45 when the outer triangle housing 45 is secured to the backplane 60. If provided, the center reflector 65 is supported by six (6) supports 70 that connect to the backplane 60.

The outer triangle housing 45 hinges downward and forward from the lip 46 of the backplane 60 via a continuous hinge 75. It is held captive at the top of the device 10 via a rotating "T"-shaped carrying handle 80. The rotating "T"-shaped carrying handle 80 also rotates along a rotational path "b" 85 that engages and disengages a first clasp 90 from within a tab 91 located on the outer triangle housing 45 in a closed state as shown. The power cable 25 exits the upper rear portion of the device 10 through the back plane 60 (not shown due to illustrative limitations). The distal end of the power cable 25 is provided cigarette lighter plug 95 and a control switch housing 100. The cigarette lighter plug 95 provides 12-VDC power for the device 10 from the electrical system of the disabled vehicle 15 (as shown in FIG. 1). The control switch housing 100 provides three (3) operating configurations of the device 10 (ON/OFF/FLASH). Further description of the operating configurations will be described herein below.

Figure 3:
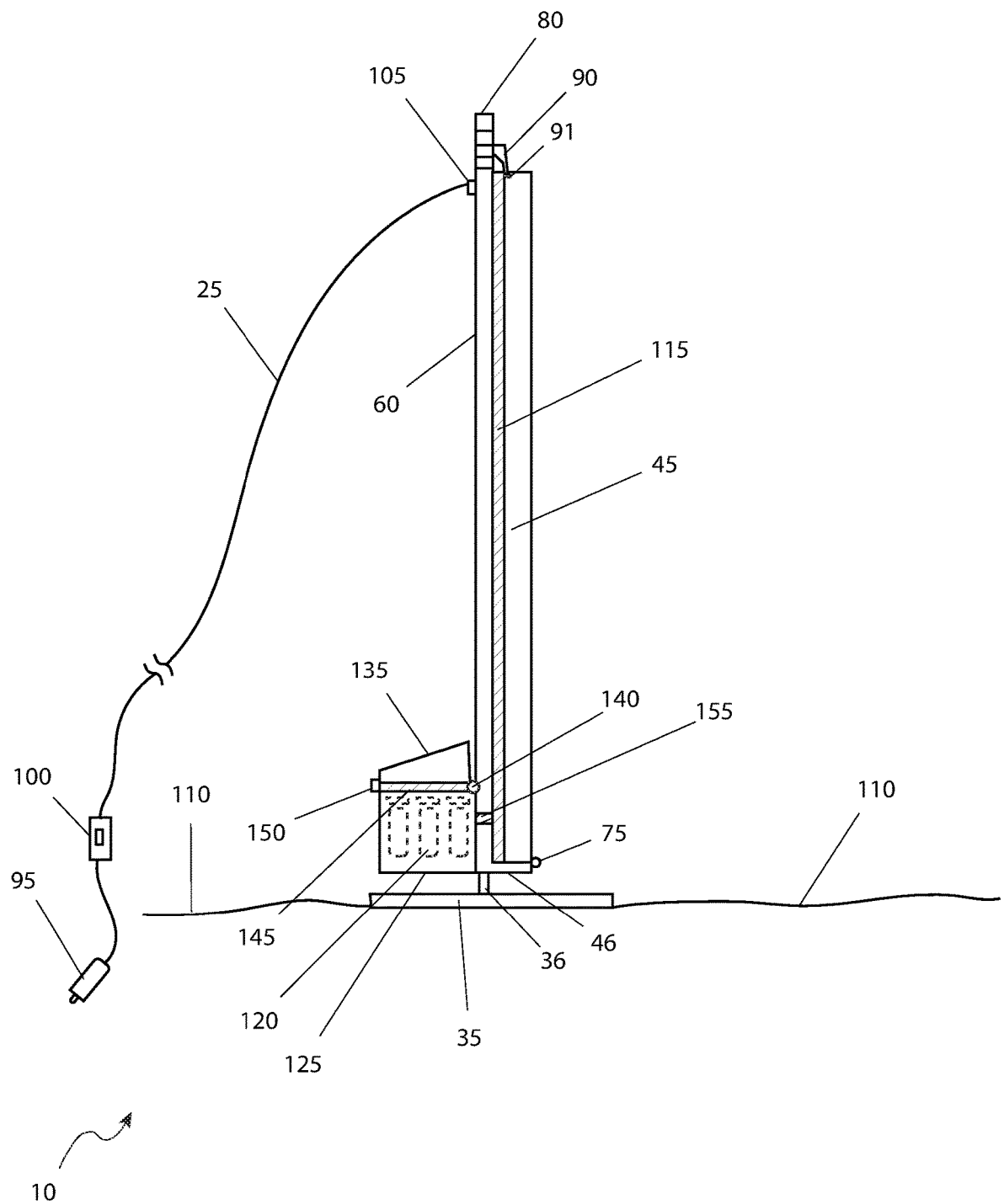
FIG. 3 is a side view of the illuminated warning triangle for disabled vehicles 10, according to the preferred embodiment of the present invention.

Referring now to FIG. 3, a side view of the device 10, according to the preferred embodiment of the present invention is shown. This view discloses a first rubber grommet 105 where the power cable 25 exits the backplane 60. The first rubber grommet 105 prevents abrasion of the power cable 25 and also prevents water infiltration to the interior components of the device 10. It is envisioned that the total overall length of the power cable 25 including the cigarette lighter plug 95 and the control switch housing 100 is twenty feet (20 ft.) in length, although longer and shorter lengths could be used with equal effectiveness. The feet 35 and legs 36 are shown in a rotated position (with respect to the position shown in FIG. 2) to allow the device 10 to stand on grade 110. A first rubber gasket 115 is provided between the lip 46 of the backplane 60 and the outer triangle housing 45 to prevent water infiltration. The first rubber gasket 115 is slightly compressed when the first clasp 90 is engaged by the rotating "T"-shaped carrying handle 80.

In addition to being powered directly by the power cable 25, the device 10 may also be powered by an internal battery bank 120 (shown via hidden lines) inside of a battery box 125. The internal battery bank 120 is held secure by Styrofoam™ 130 (shown via hidden lines) on the interior. The battery box 125 is provided with a sloped lid 135 to prevent the entrance of water inside. The sloped lid 135 is attached to the battery box 125 via a hinge 140. The hinge 140 is located on the rear surface at the top of the bottom leg of the backplane 60. This location enables the lid 135 to hinge open and travel through the triangular center cut-out of the back pane 60 and outer triangle housing 45 when the center reflector 65 is removed, if it is present. This enables access to the interior of the battery box 125. A second rubber gasket 145 is provided between the battery box 125 and sloped lid 135 and is compressed by a second clasp 150. A second rubber grommet 155 provides a path for internal wiring between the battery box 125 and the electrical components housed within the outer triangle housing 45.

Figure 4:
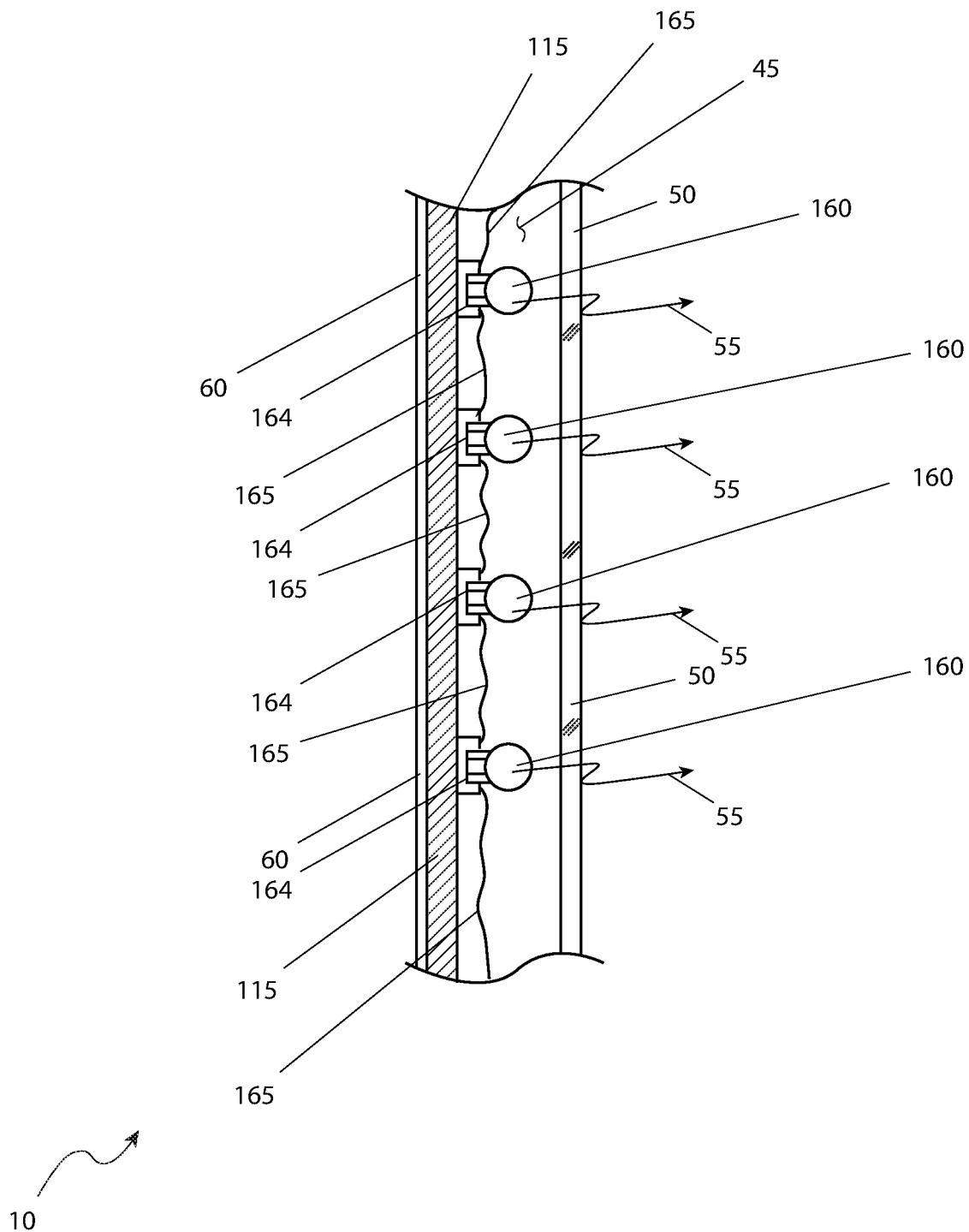
FIG. 4 is a sectional view of the illuminated warning triangle for disabled vehicles 10, as seen along a line I-I, as shown in FIG. 2, according to the preferred embodiment of the present invention.

Referring next to FIG. 4, a sectional view of the device 10, as seen along a line I-I, as shown in FIG. 2, according to the preferred embodiment of the present invention is disclosed. Each of a multitude of lamps 160 are mounted to an individual socket 164 and arrayed in a linear fashion within the outer triangle housing 45 and interconnected in a parallel fashion with interconnecting wiring 165. It is envisioned that the lamps 160 may be incandescent, light-emitting diode (LED) type, COB type, or the like. The exact type and quantity of lamps 160 used by the present invention is not intended to be a limiting factor of the present invention. One (1) side of the first rubber gasket 115 as compressed between the backplane 60 and the outer triangle housing 45 is visible. The lamps 160 produce light rays 55 that exit through the translucent nature of the inner reflective lens 50. In a preferred embodiment, the array of lamps 160 are aligned with the inner reflective lens 50. It is envisioned that the lamps 160 would produce white light that passes through the inner reflective lens 50 which would be red in color to thus produce red light on the exterior of the device 10. However, it also envisioned that the lamps 160 could be red in color and would pass through an inner reflective lens 50 that is clear in color to also produce red light.

Figure 5:
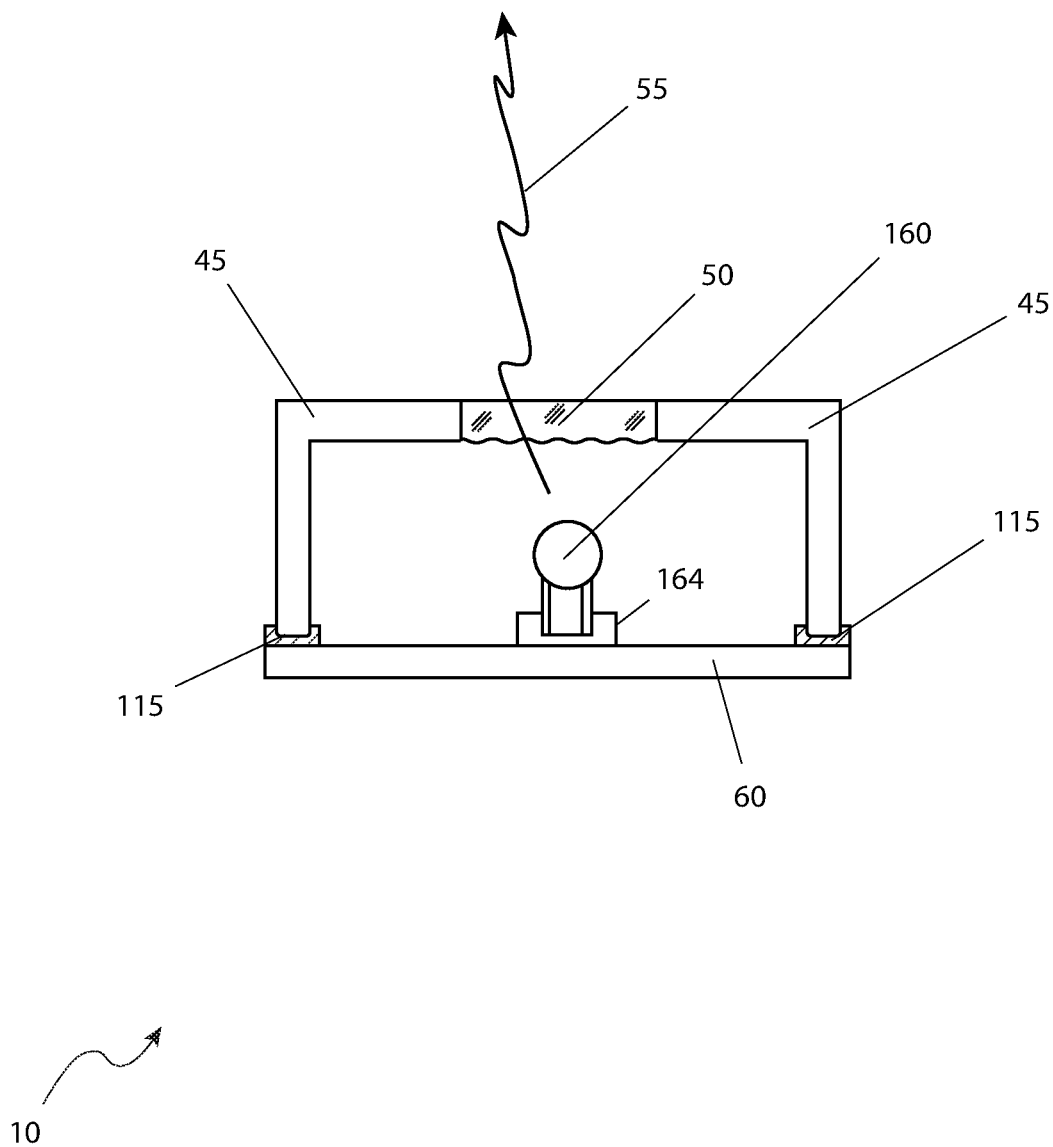
FIG. 5 is a sectional view of the illuminated warning triangle for disabled vehicles 10, as shown along a line II-II, as shown in FIG. 2, according to the preferred embodiment of the present invention; and, FIG. 6 in an electrical block diagram disclosing the major electrical components

Referring now to FIG. 5, a sectional view of the illuminated warning triangle for disabled vehicles 10, as shown along a line II-II, as shown in FIG. 2, according to the preferred embodiment of the present invention is depicted. This view provides a clearer indication of the watertight cavity provided by the first rubber gasket 115 compressed between the outer triangle housing 45 and the backplane 60. The light rays 55 from the lamps 160 pass through the inner reflective lens 50 as aforementioned described.

Figure 6:
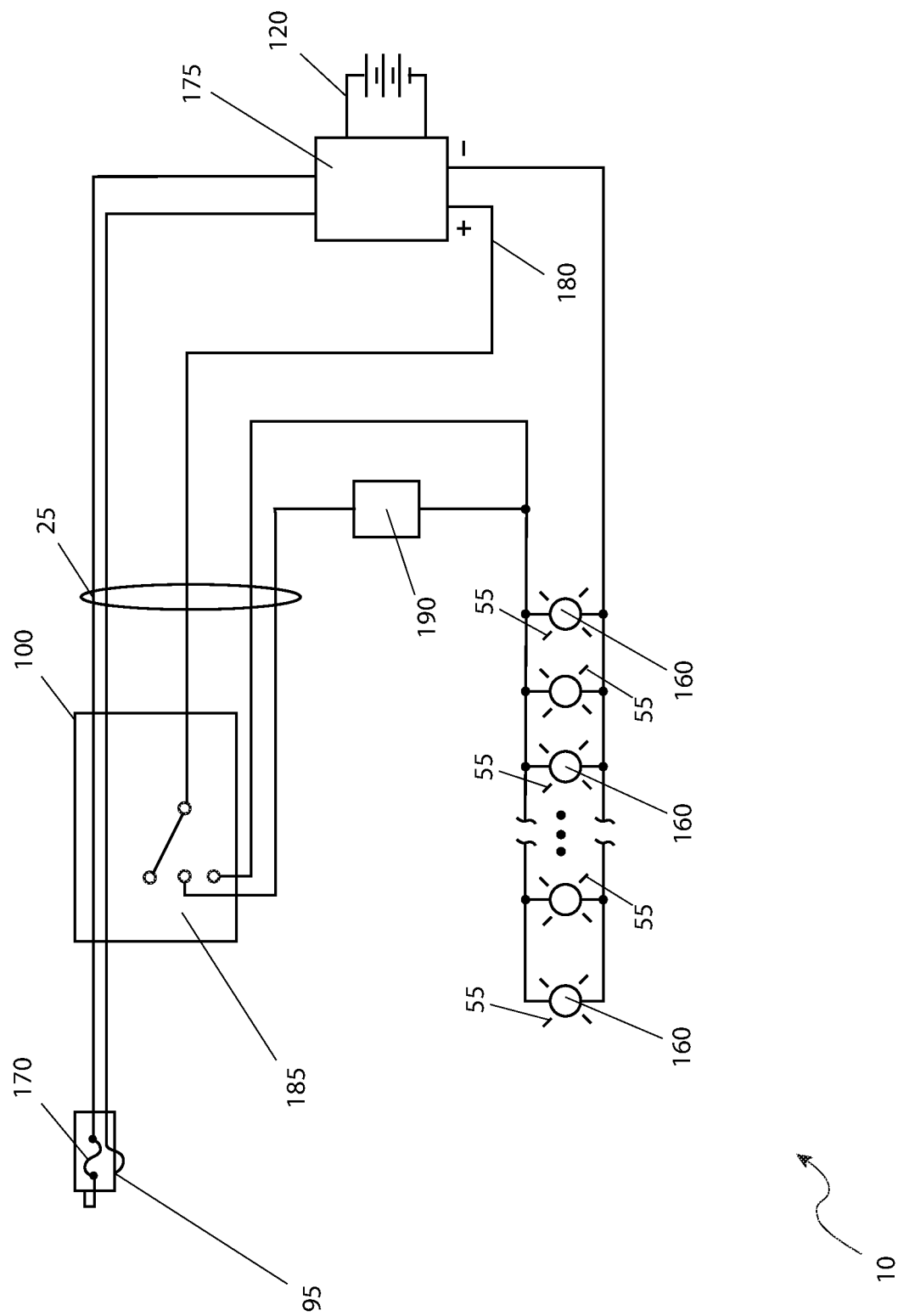

Referring to FIG. 6, an electrical block diagram disclosing the major electrical components is shown. Power is provided through the cigarette lighter plug 95 equipped with a fuse 170 for overcurrent protection. The power passes through the control switch housing 100 and terminates at a battery charger 175 which charges the internal battery bank 120 and provides power for the remainder of the device 10. The positive lead 180 is routed back to the control switch housing 100 via the power cable 25 and terminates at the common pole of a three-position switch 185. The upper position is the OFF position. The middle position is the ON position which routes the power to the lamps 160 connected in a parallel fashion. The lower position routes power to a flasher module 190 which allows the lamps 160 to flash on and off to increase the attention gathering characteristics of the device 10.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 through conventional procurement channels such as auto part stores, discount stores, travel accessory stores, and mail order/internet stores.

After procurement and prior to utilization, the device 10 would be prepared in the following manner: the power cable 25 and cigarette lighter plug 95 would be connected to a suitable source of 12 VDC power, such as a cigarette lighter 30, to charge the internal battery bank 120 for a suitable period of time; the device 10 would then be stored in a motor vehicle in a suitable location such as a storage compartment, cargo area, trunk, or the like until needed.

During utilization of the device 10, the following procedure would be initiated: upon becoming a disabled vehicle 15, the user would safely navigate to the side of a roadway or other suitable safe location; the user would retrieve the device 10 from its storage location; the device 10 may be powered from the electrical system of the disabled vehicle 15 provided said electrical system is still functional, by locating the device 10 a suitable distance behind the disabled vehicle 15 and running the power cable 25 into the cabin of the disabled vehicle 15 and plugging the cigarette lighter plug 95 into the cigarette lighter 30; user may then select ON, or preferable FLASH via the control switch housing 100, to allow the device 10 to warn oncoming motorists approaching from the direction of approaching traffic "t" 20. Should the electrical system of the disabled vehicle 15 not be functional, the device 10 may be operated from its internal battery bank 120 by simply activating the control switch housing 100 to the ON or preferably FLASH position. This operation would continue until the disabled vehicle 15 is rescued or otherwise removed.

After use of the device 10, it is turned to the OFF position via the control switch housing 100 and unplugged from the cigarette lighter 30 if so utilized. If the internal battery bank 120 was utilized, it should be recharged by connecting the cigarette lighter plug 95 to a suitable source of 12 VDC power, such as a cigarette lighter 30, to charge the internal battery bank 120 for a suitable period of time; the device 10 is then stored in the subject vehicle until needed again in a cyclical usage pattern as described above.

The features of the device 10 provide the following benefits: the light rays 55 from the device 10 are envisioned to be visible up to a mile away to provide advance warning capabilities; usage of the device 10 provides the functionality of a road flare without the associated ignition or burn dangers; the device 10 is low voltage and completely waterproof making it safe to use in all weather conditions; and it is safely storable in vehicles and ready to utilize at a moment's notice.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated contemplated.

What is claimed is:

1. An illuminated warning triangle, comprising:
a back plane shaped as a triangular prism with a triangular center cut-out, the back plane having a circumferential lip about an entire perimeter of the back plane;
an outer triangle housing having a triangular prism shape with a triangular center cut-out, the outer triangle housing is hingedly attached to the circumferential lip of the back plane, the back plane and the outer triangle housing each having a bottom leg, a first side leg, and a center side leg, the outer triangle housing hinges downward and forward from the lip of the back plane via a continuous hinge and is held captive at the top of the illuminated warning triangle via a rotating T-shaped carrying handle, the rotating T-shaped carrying handle also rotates along a rotational path that engages and disengages a first clasp from within a tab located on the outer triangle housing in a closed state;
a pair of feet each mounted on each of the legs that support the illuminated warning triangle;
an inner reflective lens incorporated into the outer triangle housing;
a center reflector residing within the common aligned triangular center cut-out of the back plane and the outer triangle housing when the outer triangle housing is secured to the back plane;
a power cable connected to a cigarette lighter plug to electrically power the illuminated warning triangle;
a control switch housing disposed on the power cable to provide three operating configurations of the illuminated warning triangle;
a first rubber grommet preventing abrasion of the power cable and water infiltration to a plurality of interior components of the illuminated warning triangle where the power cable exits the back plane;
a first rubber gasket provided between the lip of the back plane and the outer triangle housing to prevent water infiltration; the first rubber gasket is slightly compressed when the first clasp is engaged by the rotating T-shaped carrying handle;
an internal battery bank secured on an interior of the battery box, the battery box is provided with a sloped lid to prevent entrance of water inside the battery box that enables the sloped lid to hinge open and travel through the triangular center cut-out of the back pane and the outer triangle housing when the center reflector is removed;
a second rubber gasket provided between the battery box and the sloped lid and is compressed by a second clasp, the second rubber grommet provides a path for internal wiring between the battery box and the electrical components housed within the outer triangle housing; and,
a plurality of lamps mounted to an individual socket and arrayed in a linear fashion within the outer triangle housing and interconnected in a parallel fashion with interconnecting wiring, the lamps produce light rays that exit through a translucent nature of the inner reflective lens, the array of lamps is aligned with the inner reflective lens.

2. The illuminated warning triangle according to claim 1, wherein the feet via the legs are designed to rotate along a rotational path relative to the back plane such that they fold flat in alignment with the illuminated warning triangle.

3. The illuminated warning triangle according to claim 2, wherein the pair of feet fold flat in alignment with the illuminated warning triangle for storage.

4. The illuminated warning triangle according to claim 2, wherein the pair of feet fold flat in alignment with the illuminated warning triangle rotate ninety degrees to support the illuminated warning triangle when used.

5. The illuminated warning triangle according to claim 1, wherein the pair of feet are linear.

6. The illuminated warning triangle according to claim 1, wherein the illuminated warning triangle is illuminated from its interior such that a plurality of light rays emanates from all three sides through the inner reflective lens.

7. The illuminated warning triangle according to claim 1, wherein the inner reflective lens is supported within the outer triangle housing by adhesive about its perimeter sidewalls.

8. The illuminated warning triangle according to claim 1, wherein the inner reflective lens has a width coextensive with a width of the outer triangle housing.

9. The illuminated warning triangle according to claim 1, wherein the center reflector is red.

10. The illuminated warning triangle according to claim 1, wherein the center reflector is supported by six supports that connect to the back plane.

11. The illuminated warning triangle according to claim 1, wherein the cigarette lighter plug includes a fuse for overcurrent protection.

12. The illuminated warning triangle according to claim 1, wherein the power cable is twenty feet long.

13. The illuminated warning triangle according to claim 1, wherein the three operating configurations are on, off, and flash.

14. The illuminated warning triangle according to claim 1, wherein the lamps are selected from the group consisting of a plurality of incandescent lamps, a plurality of light-emitting diode lamps, or a plurality of COB lamps.

15. The illuminated warning triangle according to claim 1, wherein the array of lamps are aligned with the inner reflective lens so that the lamps would produce white light that passes through the inner reflective lens which would be red in color to thus produce red light on an exterior of the illuminated warning triangle.

16. The illuminated warning triangle according to claim 1, further comprising a watertight cavity provided by the first rubber gasket compressed between the outer triangle housing and the back plane.

17. The illuminated warning triangle according to claim 1, wherein the illuminated warning triangle is used to signal a disabled vehicle on the side of road.

18. The illuminated warning triangle according to claim 17, wherein the illuminated warning triangle is placed before the disabled vehicle according to a direction of approaching traffic.

19. The illuminated warning triangle according to claim 1, wherein the illuminated warning triangle is seventeen inches long on one side.

* * * * *